United States Patent
Seurat Guiochet et al.

(10) Patent No.: US 7,703,385 B2
(45) Date of Patent: Apr. 27, 2010

(54) OPTIMIZED DECOMPRESSION PRESSURE COOKING APPLIANCE

(75) Inventors: Marie-Aurore Claire Seurat Guiochet, Bretigny (FR); Jean-Marie Daniel Anota, Dijon (FR); Eric Chameroy, Veronnes (FR)

(73) Assignee: SEB S.A., Ecully Cedex (FR)

( * ) Notice: Subject to any disclaimer, the term of this patent is extended or adjusted under 35 U.S.C. 154(b) by 948 days.

(21) Appl. No.: 11/223,580

(22) Filed: Sep. 9, 2005

(65) Prior Publication Data

US 2006/0054026 A1 Mar. 16, 2006

(30) Foreign Application Priority Data

Sep. 9, 2004 (FR) .................................. 04 09594

(51) Int. Cl.
*A23L 1/00* (2006.01)
(52) U.S. Cl. ..................... 99/337; 99/403; 220/314; 220/316; 220/912
(58) Field of Classification Search ........... 99/337–338, 99/403–418, 467; 220/314–316, 912; 126/369
See application file for complete search history.

(56) References Cited

U.S. PATENT DOCUMENTS

| | | | | |
|---|---|---|---|---|
| 2,459,553 A | * | 1/1949 | Sullivan | 137/516 |
| 2,463,516 A | * | 3/1949 | Burkhardt | 137/524 |
| 5,370,257 A | * | 12/1994 | Chameroy et al. | 220/316 |
| 5,613,424 A | * | 3/1997 | Chameroy et al. | 99/337 |
| 5,678,721 A | * | 10/1997 | Cartigny et al. | 220/316 |
| 6,425,320 B1 | * | 7/2002 | Chameroy et al. | 99/337 |
| 6,523,459 B1 | * | 2/2003 | Chameroy et al. | 99/337 |
| 6,695,319 B1 | * | 2/2004 | Anota et al. | 277/628 |

FOREIGN PATENT DOCUMENTS

| | | |
|---|---|---|
| DE | 23 53 384 A1 | 5/1975 |
| EP | 0 651 962 A | 5/1995 |
| FR | 2 455 875 A | 12/1980 |

* cited by examiner

*Primary Examiner*—Timothy F. Simone
(74) *Attorney, Agent, or Firm*—Thomas, Kayden, Horstemeyer & Risley LLP (57) ABSTRACT

A pressure cooking appliance arranged to form a cooking chamber and comprising an adjustment device (7) of the pressure inside the chamber, which comprises a steam leakage pipe, said pipe defining a steam inlet section (8) and a flow section (9), wherein the adjustment device (7) comprises setting means (11) of the inlet section (8) and flow section (9), which is mobile between an open position, wherein it sets the inlet section (8) and flow section (9) so as to prevent the pressure applied inside the chamber from rising above a safety pressure and a decompression position, wherein it sets the inlet section (8) and flow section (9) to enable the decompression of the chamber to the safety pressure, without food projection.

21 Claims, 5 Drawing Sheets

OPTIMIZED DECOMPRESSION PRESSURE COOKING APPLIANCE

CROSS-REFERENCE TO RELATED APPLICATION

This Application claims priority to copending French Patent Application entitled, "Optimized Decompression Pressure Cooking Appliance," having Application No. FR-04 09594, filed on Sep. 9, 2004, which is entirely incorporated herein by reference.

TECHNICAL FIELD

The present disclosure relates to the general technical field household food cooking appliances, designed to form a tight cooking chamber, wherein foods are cooked under vapour pressure.

The present disclosure relates more specifically to a household food pressure cooking appliance arranged to form a cooking chamber, said appliance comprising an adjustment device of the pressure inside the chamber, said device itself comprising a leakage pipe used to establish a steam leakage flow from inside the chamber to outside the appliance, said pipe defining, firstly, a steam inlet section, through which the steam contained in the chamber enters the pipe, and, secondly, a flow section, located downstream from the inlet section in the direction of the leakage flow.

The present disclosure also relates to a method to cook food using a household pressure cooking appliance arranged to form a cooking chamber.

BACKGROUND

Household cooking appliances, such as pressure cookers, are well known in the prior art. They are used to produce a hermetic chamber wherein foods are placed, said chamber being able to reach high pressures and temperatures when the appliance is subjected to the influence of a heating source.

The combined effects of the high pressure and temperature levels reached in these known appliances thus make it possible to cook foods extremely quickly, while respecting the organoleptic and nutritional properties of the foods.

So that the user can open the lid in complete safety, without any risk of a sudden outflow from said lid under the effect of pressure, it is necessary to decompress the appliance beforehand.

To decompress a cooking appliance according to the prior art, there are several possibilities.

In this way, the appliance may be placed under running cold water.

However, such a solution is not very satisfactory, as it involves a relatively long decompression time before the chamber reaches a pressure compatible with a safe opening of the lid.

Such a decompression method also proves to be relatively difficult for the user to carry out, as it involves moving the heavy and extremely hot appliance, with all the associated discomfort and risk, to a water tap connection.

In addition, such a method is impracticable if the user wishes to carry out decompression during cooking, so as to open the lid to check the progress of the cooking or simply to add an ingredient. In this case, the user would in fact be obliged to put the cooking appliance back onto the heating source while said appliance is wet, which would particularly be liable to soil, or damage, the heating source and its environment.

Another method, provided by numerous pressure cooking appliance manufacturers, consists of adjusting the regulation valve of the appliance, naturally if said appliance is equipped with a valve, so as to connect the inside of the chamber with the outside. Such a method generally proves to be particularly beneficial, since most of the time it only requires a very simple procedure (actuation of a handle or removal of the valve).

However, this method only gives full satisfaction when the user is familiar with pressure cooking with the appliance. Otherwise, there is a risk of the user causing the projection of extremely hot food during decompression.

In addition, the decompression obtained using this method is generally relatively long, which prevents the user from using it during cooking in order to check the progress of cooking quickly or to add an ingredient.

SUMMARY

In response to these and other shortcomings of the prior art, an optimized decompression pressure cooking applicance is disclosed. The aim of the disclosure is to propose a new household food pressure cooking appliance resolving the various drawbacks listed above and enable safe and quick decompression, even during cooking, while having a simple and economical design.

A further aim of the disclosure is to propose a new household food pressure cooking appliance with a particularly simplified design.

A further aim of the disclosure is to propose a new household food pressure cooking appliance enabling excellent decompression flow control.

A further aim of the disclosure is to propose a new household food pressure cooking appliance wherein the operation is based on simple and tried-and-tested mechanical principles.

A further aim of the disclosure is to propose a new household food pressure cooking appliance implementing compact and robust means.

A further aim of the disclosure is to propose a new household food pressure cooking appliance built using a minimum number of parts.

A further aim of the disclosure is to propose a particularly safe new household food pressure cooking appliance.

A further aim of the disclosure is to propose a new household food pressure cooking appliance wherein the decompression is particularly quick and safe.

A further aim of the disclosure is to propose a new method to cook foods using a household pressure cooking appliance enabling particularly quick, simple, safe and clean decompression of the appliance, even during cooking.

The aims assigned to the disclosure are achieved using a household food pressure cooking appliance arranged to form a cooking chamber, said appliance comprising a device to adjust the pressure inside the chamber, said device itself comprising a leakage pipe used to establish a steam leakage flow from inside the chamber to outside the appliance, said pipe defining, firstly, a steam inlet section, through which the steam contained in the chamber enters the pipe, and, secondly, a flow section, located downstream from the inlet section in the direction of the leakage flow, characterised in that the adjustment device comprises setting means of the inlet and flow sections, said setting means being mobile between at least, firstly, an open position, wherein it sets the inlet and flow sections to enable a steam leakage via the pipe while preventing the pressure applied in the chamber rising above a predetermined safety pressure, and, secondly, a decompression position, wherein it sets the inlet and flow sections to enable the quickest possible decompression of the chamber to the predetermined safety pressure, without substantial projection of foods outside the appliance.

The aims assigned to the disclosure are also achieved by means of a method to cook foods using a household pressure cooking appliance arranged to form a cooking chamber, said appliance comprising a device to adjust the pressure inside the chamber, said device itself comprising a leakage pipe used to establish a steam leakage flow from inside the chamber to outside the appliance, said pipe defining, firstly, a steam inlet section, through which the steam contained in the chamber enters the pipe, and, secondly, a flow section, located downstream from the inlet section in the direction of the leakage flow, the adjustment device comprising setting means of the inlet and flow sections, said method comprising, firstly, an opening step, wherein, using the setting means, the inlet and flow sections are set to enable a steam leakage via the pipe while preventing the pressure applied in the chamber rising above a predetermined safety pressure, and, secondly, a decompression step, during which, using the setting means, the inlet and flow sections are set to enable the quickest possible decompression of the chamber to the predetermined safety pressure, without substantial projection of foods outside the appliance.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various aspects of the cooking appliance, having been summarized above, reference will now be made in detail to the description of the representative assembly illustrated in the drawings. While the cooking appliance will be described in connection with these drawings, there is no intent to limit it to the embodiment or embodiments disclosed therein.

The cooking appliance according to the disclosure is designed to carry out pressure cooking of different foods in a household context.

Preferentially, the cooking appliance 1 according to the disclosure is a pressure cooker type appliance.

Conventionally, the appliance 1 according to the disclosure is arranged to form a cooking chamber, which is preferentially substantially tight and intended to be subjected to the effect of a heating source, such as a cooking plate or an onboard electrical element.

Figure 1:
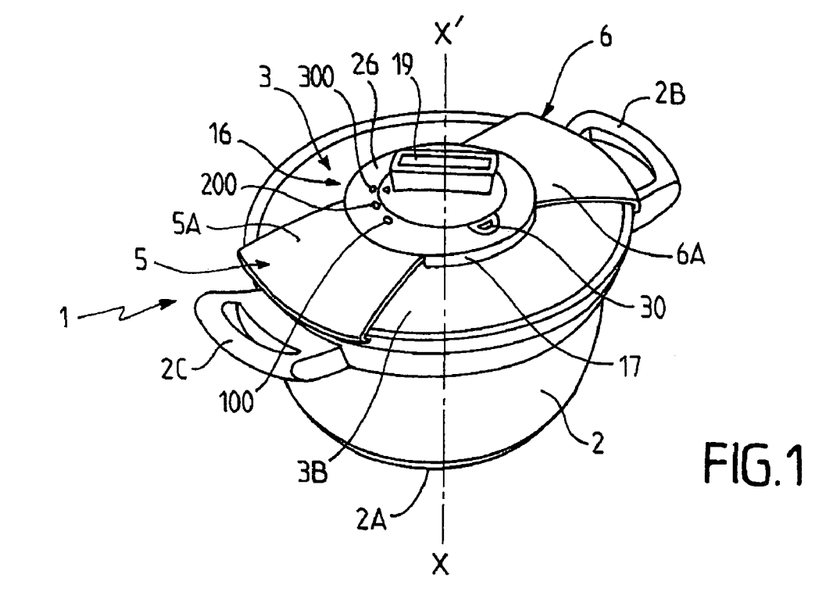
FIG. 1 is a general perspective view of a household cooking appliance according to the disclosure.

Advantageously, the cooking appliance 1 according to the disclosure comprises a vessel 2 forming a cooking receptacle and preferentially displaying a substantial revolution symmetry along an axis X-X' (see FIG. 1).

Hereinafter, the adjective "axial" will refer to the direction of this symmetry axis X-X', said direction being similar to the vertical direction when the appliance is in normal operation.

The vessel 2 is conventionally manufactured from a metal material such as stainless steel, and is preferentially equipped with a heat-conducting base 2A attached to the vessel, for example by means of hot stamping.

The vessel 2 may also comprises gripping devices such as handles 2B, 2C, preferentially two in number, and attached to the vessel 2 in a diametrically opposed fashion, for example (see FIG. 1).

The appliance 1 according to the disclosure also advantageously comprises a lid 3 intended to be mounted and locked on the vessel 2 to form with said vessel a cooking chamber. The vessel 2 and the lid 3 are designed such that the chamber is sufficiently hermetic to enable a pressure rise in the appliance.

The lid 3, wherein the shape is preferentially complementary to that of the vessel 2 and, for example, is of an overall discoid shape, comprises, firstly, an internal face 3A intended to be located opposite the vessel 2 when the lid is locked on said vessel, and, secondly, an external face 3B opposite said internal face 3A, said external face 3B being intended to be oriented towards the outside of the vessel 2, when the vessel 2 and the lid 3 form the cooking chamber.

Figure 2:
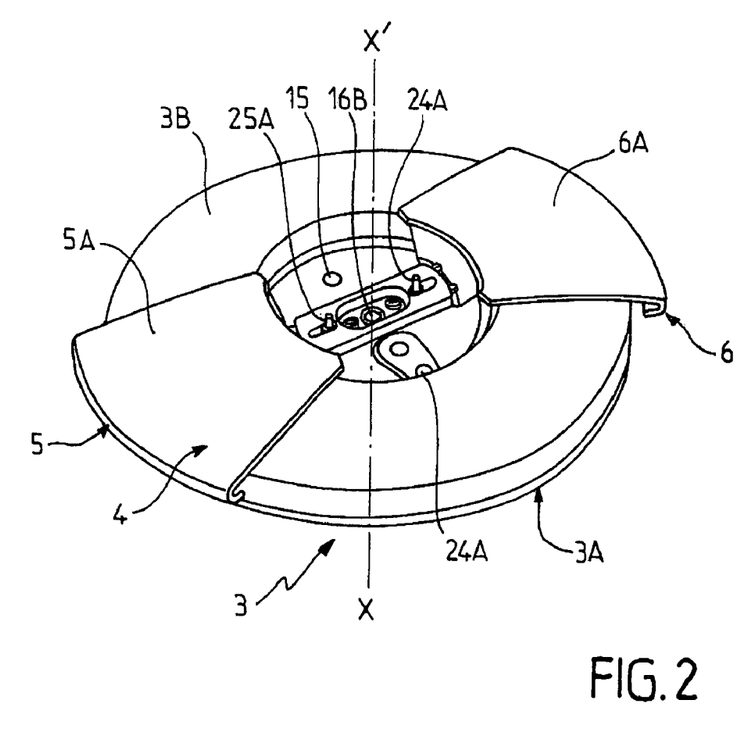
FIG. 2 is a schematic perspective view of the lid of a household cooking appliance according to the disclosure.

The lid 3 may be locked or unlocked on the vessel 2 using locking/unlocking means 4 of the lid 3 with respect to the vessel 2 (particularly represented in FIG. 1 and FIG. 2).

The locking/unlocking means 4 may be of any type known to those skilled in the art, and conventionally is liable to move between, firstly, at least one locking position of the lid 3 with respect to the vessel 2, wherein the lid 3 is attached to the vessel 2, and, secondly, at least one unlocking position of the lid 3 with respect to the vessel 2, wherein the lid 3 can be separated, for example manually, from the vessel 2 by the user.

Examples of locking/unlocking means 4 that can be used within the scope of the disclosure particularly include jaw systems (corresponding to the alternative embodiment represented in the figures), segment, bayonet or clamp systems, this list being in no way exhaustive.

In the case illustrated in the figures, the locking/unlocking means 4 of the appliance according to the disclosure comprises two jaws 5, 6 fitted in a diametrically opposed fashion in radial translation on the lid 3, by means of a corresponding actuation arm 5A, 6A.

Conventionally, said jaws 5, 6 come in the form of a U-shaped profiled metal plate at the external end, so as to be able to clasp the peripheral edges of the vessel 2 and lid 3.

According to the disclosure, the appliance 1 comprises an adjustment device 7 of the pressure inside the chamber.

According to the disclosure, the adjustment device 7 comprises a leakage pipe used to establish a steam leakage flow from inside the chamber to outside the appliance 1.

Therefore, said adjustment device 7 is preferentially a device enabling the connection of the inside of the chamber with the outside, particularly with a view to reducing the pressure applied in said chamber.

According to the disclosure, the pipe defines a steam inlet section 8, through which the steam contained in the chamber enters the pipe to be discharged outside.

The pipe also defines a flow section 9, preferentially separate from the inlet section 8, said flow section 9 being located downstream from the section 8 in the direction of the leakage flow.

In other words, the steam leakage flow, after passing through the inlet section 8, will pass through the flow section 9 before being discharged from the appliance 1.

Advantageously, the pipe also defines a steam outlet section 10, separate from the inlet section 8 and flow section 9, and located downstream from the flow section 9 in the direction of the leakage flow.

In this way, as illustrated in the figures, the steam being discharged via the leakage pipe of the pressure adjustment device 7 will first of all pass through the inlet section 8, and then through the flow section 9, to finally come out via the outlet section 10.

According to an important characteristic of the disclosure, the adjustment device 7 comprises setting means 11 of the inlet section 8 and the flow section 9.

In other words, the setting means 11, which is preferentially single and one-piece, is used to modify, preferentially simultaneously, the configuration and/or design of said inlet section 8 and flow section 9, in order to adjust the characteristics of the steam flow discharged into the pipe, particularly the velocity, flow rate and laminar or turbulent nature of said flow, this list being non-exhaustive.

According to the disclosure, the setting means 11 is mobile between at least, firstly, an open position (particularly represented in FIG. 6) and, secondly, a decompression position (particularly represented in FIG. 9), the open and decompression positions being preferentially, as illustrated in the figures, separate and stable positions.

In the open position, the setting means 11 sets the inlet and flow sections to enable a steam leakage via the pipe while preventing the pressure applied in the chamber rising above a predetermined safety pressure.

Therefore, the open position is a leakage position, i.e. a position wherein the inside of the chamber is substantially permanently connected to the outside. In addition, in the open position, the inlet section 8 and flow section 9 are such that they prevent, by enabling a sufficient leakage, the pressure in the chamber from rising above a predetermined safety pressure, above which it would be dangerous to unlock the lid as it would be liable to result in a sudden outflow from the lid.

In other words, in the open position, which is preferentially an indexed position as described in more detail hereinafter, the inlet section 8 and the flow section 9 are configured and designed with respect to each other such that the steam leakage flow passing through the pipe is at a sufficient flow rate with respect to the dimensions of the cooking chamber to prevent the pressure in said chamber from rising above a predetermined safety pressure.

This safety pressure corresponds to a pressure level applied in the chamber compatible with safe opening of the lid 3 by the user. Preferentially, the safety pressure does not exceed the atmospheric pressure by more than 2 kPa.

Preferentially, the adjustment device 7 is designed such that, when the setting means 11 is in the open position, the steam leakage flow rate is at the maximum, thus making it possible to return the chamber to atmospheric pressure as quickly as possible, in view of the dimensions and design of the appliance 1.

In the decompression position, the setting means 11 sets the inlet section 8 and flow section 9 to enable the quickest possible decompression of the chamber to the predetermined safety pressure, without substantial projection of foods outside the appliance.

In this way, the setting means 11 is in the decompression position, the inlet section 8 and flow section 9 are configured and designed to evacuate, at the highest possible flow rate, the steam contained in the chamber, in the form of a flow consisting solely of steam and substantially free from foods or food particles contained in the chamber.

In other words, when the setting means is in its indexed decompression position, the inlet and flow sections allow a flow wherein the flow rate and level of turbulence enable the pressure to drop as quickly as possible according to the characteristics of the appliance without the foods present in the chamber being driven or projected outside.

In order to configure and design the inlet section 8 and flow section 9, those skilled in the art will take into account the different variable parameters according to the appliances, while bearing in mind that the aim to be achieved consists of (1) ensuring the quickest possible decompression of the appliance, irrespective of the initial pressure level applied in the chamber, in particular when said pressure applied in the chamber corresponds to the cooking pressure (referred to as the "regulation pressure") of the appliance, and (2) generating a leakage flow which substantially consists solely of steam, excluding any food particles (liquid, solid or pasty) of a significant size with respect to standard safety and cleanliness requirements.

The influential parameters to be taken into account are, in particular, according to the knowledge of those skilled in the art, (1) the operating pressure (regulation pressure) of the appliance, (2) the dimensions of the chamber, and (3) the heating power range to which the appliance may be subjected.

In this way, the applicant demonstrated that by simply setting two sections, i.e. the inlet section 8 and flow section 9, with respect to the design of the rest of the appliance, it was possible to obtain a steam flow which does not generate food projection, without it being necessary to use additional protection means such as grids or screens fitted in the pipe or opposite said pipe.

Preferentially, when the setting means 11 is in the decompression position, the inlet section 8 and flow section 9 are set to enable the quickest possible decompression of the chamber to the predetermined safety pressure, without substantial projection of the foods outside the appliance and without switching off the heating source applied to the chamber, such that said chamber is continuously under the effect of the heating source.

Therefore, the decompression position is naturally also a leakage position, i.e. a position wherein the cooking chamber is substantially continuously connected to the outside, to reduce the pressure applied in the chamber.

In this way, the user can obtain, completely safely and cleanly, the decompression of the appliance during the cooking process, without switching off the heating source or removing the appliance from the cooking plate.

Advantageously, the open position and/or the decompression position are indexed positions, i.e. predetermined and clearly identifiable as such by the user, for example using a suitable visual identification system 100, 200, 300.

Advantageously, the inlet section 8 and flow section 9 are oriented substantially at an angle with respect to each other, i.e. the inlet section 8 extends along an inlet plane, while the flow section extends along a flow plane, said inlet and flow planes being secants.

In this way, according to this arrangement, the steam flow discharged via the pipe will be obliged, after passing via the inlet section 8, to turn a more or less acute angle to pass via the flow section 9.

This configuration particularly enables excellent steam leakage flow control and helps prevent, in combination with a suitable design and configuration of the inlet section 8 and flow section 9, undesirable food projections outside when the setting means 11 is in the decompression position.

More preferentially, the inlet section 8 and flow section 9 are oriented substantially transversely with respect to each other, i.e. the steam flow is obliged to turn substantially by 90° between the inlet section 8 and the flow section 9.

Advantageously, the appliance 1 according to the disclosure comprises a pressure regulation valve 11A.

Preferentially, said valve 11A forms the setting means 11. In this way, the pressure regulation valve 11A carries out a dual role since, firstly, it takes part in the setting of the inlet section 8 and flow section 9, as explained above and, secondly, it helps maintain the cooking chamber at a predetermined pressure level, conventionally referred to as the operating or regulation pressure.

As a result, according to this embodiment of the disclosure which corresponds to that illustrated in the figures, the setting means 11, formed by the valve 11A, is liable to be in an indexed regulation position (illustrated in FIG. 12) wherein, firstly, it substantially prevents any connection of the inside of the chamber to the outside while the pressure applied in the chamber is less than the predetermined regulation pressure and, secondly, it connects the inside of the chamber with the outside once the pressure applied in the chamber has substantially reached said predetermined regulation pressure.

Figure 12:
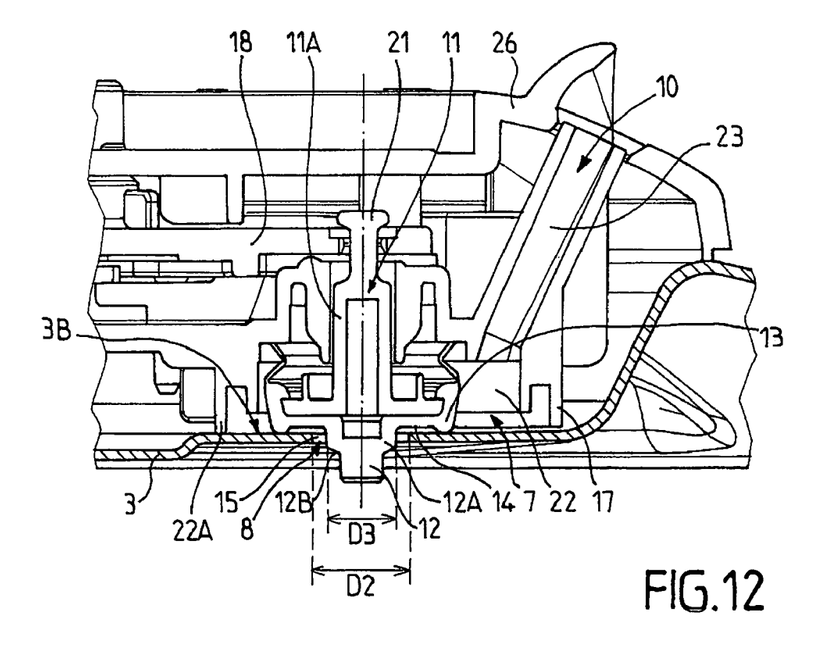
FIG. 12 is a partial sectional view along A-A of the control module represented in FIG. 11.
Figure 13:
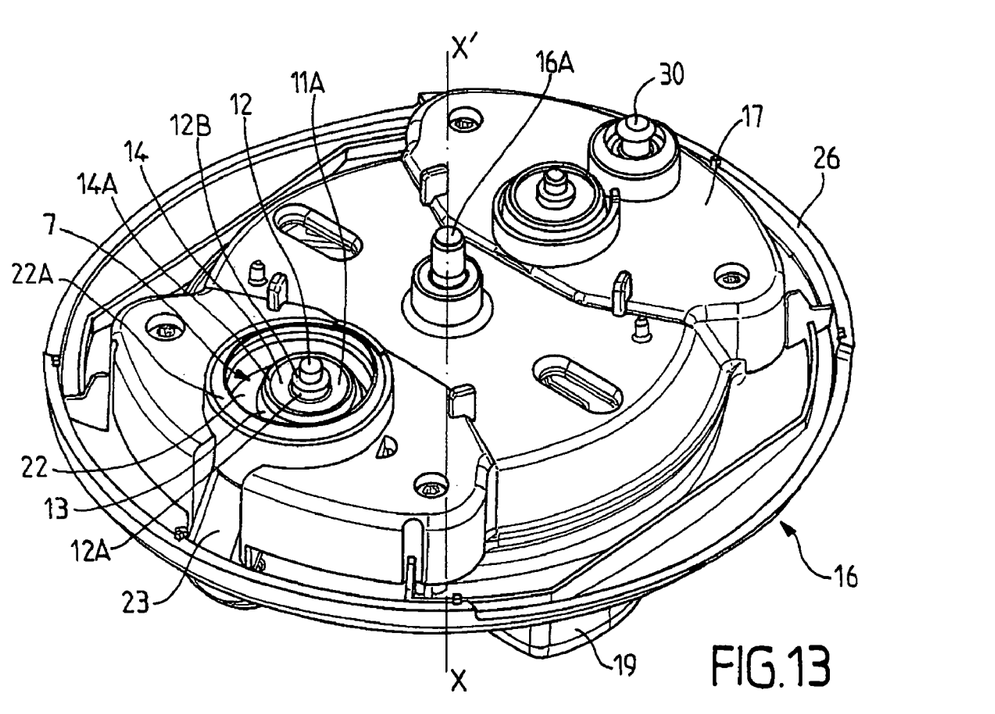
FIG. 13 is a perspective view of the bottom of the control module represented particularly in FIG. 4, FIG. 7 and FIG. 10.

In the alternative embodiment illustrated in the figures, the safety valve 11A prevents the connection of the inside of the chamber with the outside while the pressure applied in the chamber is less than the predetermined regulation pressure, by substantially removing the flow section 9, as illustrated in FIG. 12, such that the steam is no longer able to continue its path to the outlet, at least while the pressure applied in the chamber is less than the regulation pressure.

Advantageously, the setting means 11, formed in this case by the valve 11A, is fitted in a sliding configuration onto the lid 3, preferentially substantially along the axial direction X-X'.

Preferentially, the valve 11A is fitted in an elastic axial sliding configuration with respect to the lid, such that the position wherein it substantially prevents any connection of the inside of the chamber with the outside while the pressure in the chamber is less than a predetermined regulation pressure (represented in FIG. 12), is an elastic return position, obtained preferentially under the effect of a compression spring (not shown).

Preferentially, the valve 11A comprises a cylindrical body comprising at least two segments 12, 13 separated by a shoulder 14, said shoulder 14 taking part in the setting of the flow section 9, while at least one of said segments, in this case the segment referenced 12 in the figures, takes part in the settings of the inlet section 8.

In this way, the setting of the inlet section 8 and flow section 9 is carried out by means of a very simple configuration of the setting means 11.

Advantageously, as illustrated in the figures, the cylindrical body of the setting means 11 comprises at least a first, a second and a third segment 12, 12A, 13, said first and second segments 12, 12A being separated by a first shoulder 12B, while the second and third segments 12A, 13 are separated by a second shoulder 14, said cylindrical body being arranged with respect to the pipe such that, firstly, the first and second segments 12, 12A take part in alternation in the setting of the inlet section 8, and that, secondly, the second shoulder 14 takes part in the setting of the flow section 9.

In this way, the setting of the inlet section 8 and flow section 9 is based on the use of geometric singularities of the setting means 11, such as for example sudden changes of sections and the associated shoulders.

Advantageously, the adjustment device 7 comprises a leakage orifice 15 provided throughout the thickness of the lid 3 between the internal face 3A and external face 3B, said leakage orifice 15 forming an access opening to the leakage pipe, i.e. acting as an interface between the inside of the chamber and said leakage pipe.

According to the embodiment represented in the figures, the inlet section 8 is defined by the cooperation of the leakage orifice 15 with the setting means 11.

In other words, the setting means 11 will partly seal the leakage orifice 15 so as to provide the steam present in the chamber with a more or less large outflow opening.

Figure 6:
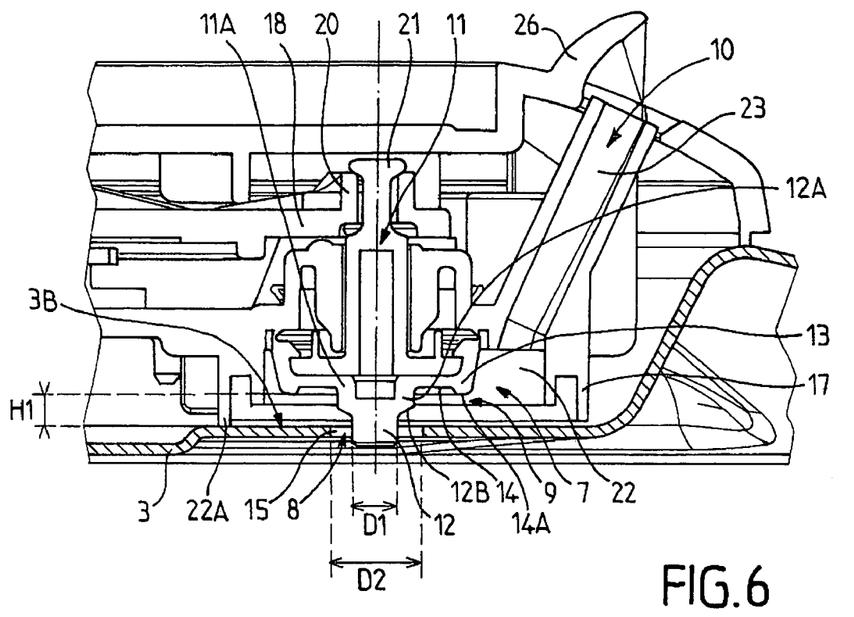
FIG. 6 is a detailed view of a partial sectional view along A-A of the module represented in FIG. 5.

Preferentially, when the setting means 11 is in the indexed open position represented in FIG. 6, the first segment 12 is inserted into the leakage orifice 15, such that the inlet section 8 has a first annular shape.

In this way, in the example represented in FIG. 6, which corresponds to the indexed open position of the setting means, the first segment 12 comprises a circular section of diameter D1, while the orifice 15 comprises a circular section of diameter D2 greater than D1, the first segment 12 being inserted axially in a substantially centred fashion in the orifice 15 so as to define with said orifice a circular ring forming the inlet section 8.

Preferentially, the diameter D1 of the first segment is substantially between 2 and 6 mm, and is preferentially substantially equal to 4 mm, while the diameter D2 of the orifice 15 is substantially between 6 and 10 mm, and is preferentially substantially equal to 8.7 mm.

In other words, the inlet section 8 is in this case advantageously between substantially 25.1 mm$^2$ and 51.3 mm$^2$, and is preferentially equal to approximately 46.9 mm$^2$.

Advantageously, when the setting means 11 is in the indexed decompression position (represented in FIG. 9), the second segment 12A is inserted into the leakage orifice 15 such that the inlet section 8 has a separate annular shape to the first annular shape, at least in its design.

Figure 9:
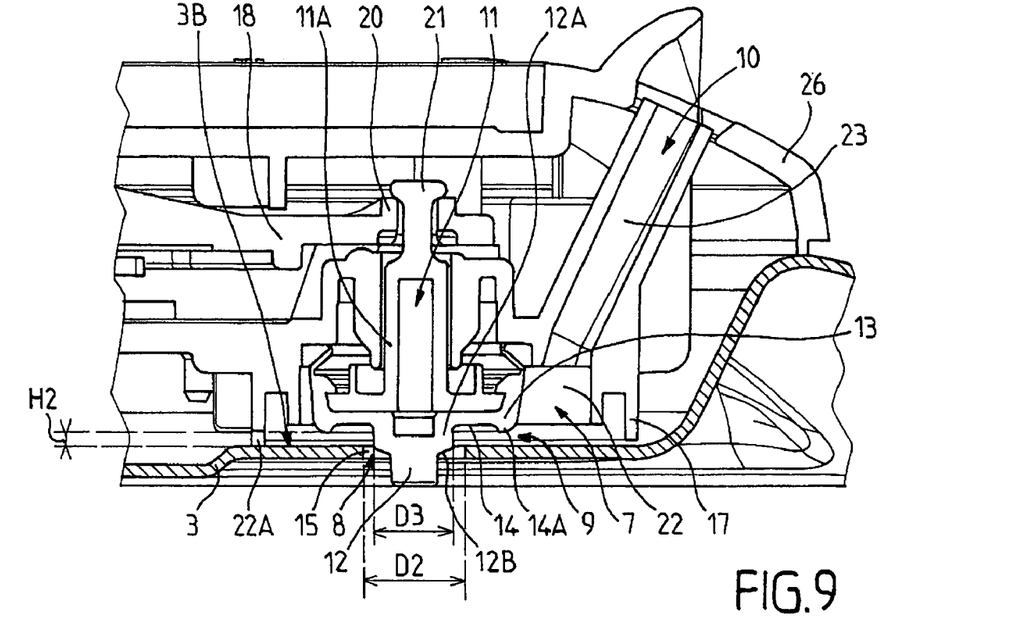
FIG. 9 is a cross-sectional view along A-A of the module represented in FIG. 8.

More specifically, in the alternative embodiment corresponding to FIG. 9, the orifice 15 always comprises a circular section of diameter D2, while the second segment 12A comprises a circular section of diameter D3, the diameter D3 being greater than D1 and less than D2.

When the setting means 11 is in the indexed decompression position, the second segment 12A is inserted into the orifice 15, in a coaxial and centred fashion, such that it defines with said orifice 15 a second circular ring, of a smaller size than that of the circular ring defined by the first segment 12 and illustrated in FIG. 6.

Preferentially, the diameter D3 of the second segment 12A is substantially between 4 and 9 mm, and is preferentially substantially equal to 6.9 mm.

In other words, the inlet section 8 is in this case advantageously between substantially 9.4 $mm^2$ and 35.4 $mm^2$, and is preferentially equal to approximately 24.8 $mm^2$.

In this way, the inlet section 8 has a greater surface area when the setting means 11 is in the indexed open position than when the setting means 11 is in the indexed decompression position.

Advantageously, when the setting means 11 is in the indexed regulation position (represented in FIG. 12), the second segment 12A is inserted into the leakage orifice 15, such that the inlet section 8 has a third annular shape, in this case substantially identical to the first annular shape defined above. In this way, the inlet section 8 corresponding to the indexed regulation position of the setting means 11 is substantially identical to the inlet section 8 corresponding to the indexed decompression position. This technical measure is naturally completely optional and it can be envisaged for the inlet section 8 to vary substantially between the indexed regulation position and the indexed decompression position.

Advantageously, the flow section 9 is defined by the cooperation of the external face 3B of the lid 3 with the setting means 11.

In this way, in the specific case corresponding to the figures, the flow section 9 is defined by the cooperation of the external face 3B of the lid 3 with the second shoulder 14. In fact, said second shoulder 14 hangs over the external face 3B of the lid 3, so as to define a steam flow between said external face 3B and the second shoulder 14.

Preferentially, with the setting means 11 is in the indexed regulation position (represented in FIG. 12), the second shoulder 14 rests against the external face 3B of the lid 3 so as to seal the leakage orifice 15, while the pressure applied in the chamber is less than the predetermined regulation pressure, said second shoulder 14 moving away from the external face under the effect of the moving power generated by the pressure, to enable the outflow of steam when the pressure applied in the chamber has substantially reached said regulation pressure.

In this way, in the example illustrated in the figures, when the setting means 11 is in the indexed regulation position, the second shoulder 14 completely seals (i.e. in a tight manner), if permitted by the pressure conditions, the orifice 15, such that the flow section 9 is zero while the inlet section 8 is defined, firstly, by the second segment 12A of diameter D3 and, secondly, by the orifice 15 of diameter D2. In this position, when the pressure in the chamber has substantially reached the regulation pressure, the valve 11A is raised slightly against its elastic return position to allow the steam to flow through the flow section 9. When a sufficient quantity of steam has been discharged to return the internal pressure below the regulation pressure, the valve 11A is automatically returned to the position illustrated in FIG. 12, i.e. to a sealing position, under the effect for example of the return force of a compression spring.

In order to seal the orifice 15, the second shoulder 14 is advantageously provided, at the periphery thereof, with a circular swelling 14A acting as a gasket.

Advantageously, when the setting means 11 is in the indexed open position (illustrated in FIG. 6), the second shoulder 14 is at an interval of a first distance H1 from the external face 3B of the lid 3.

In this way, the steam leakage flow has a clearance of a height H1 between the external face 3B and the shoulder 14 to be discharged to the outlet section 10 and subsequently to the outside. As a result, when the setting means 11 of the appliance 1 corresponding to the alternative embodiment illustrated in FIG. 6 is in the indexed open position, the inlet section 8 is defined by the orifice 15 of diameter D2 and the first segment 12 of diameter D1, while the flow section 9 is characterised by the distance H1 separating the external face 3B of the lid of the second shoulder 14.

Preferentially, the distance H1 is substantially between 1 and 6 mm, and is preferentially substantially equal to 3 mm.

Advantageously, when the setting means 11 is in the indexed decompression position (represented in FIG. 9), the second shoulder 14 is at an interval of a second distance H2 from the external face 3B of the lid 3. In this way, when the setting means 11 of the appliance 1 according to the embodiment illustrated in FIG. 9 is in the indexed decompression position, the inlet section 8 is defined by the cooperation of the second segment 12A of diameter D3 and the orifice 15 of diameter D2, while the flow section 9 is characterised by the distance H2 separating the external face 3B from the lid 3 of the second shoulder 14.

Preferentially, the distance H2 is substantially between 0.3 and 2.5 mm and is preferentially substantially equal to 1.2 mm.

Advantageously, the first distance H1 separating the second shoulder 14 from the external face 3B when the setting means 11 is in the open position is greater than the second distance H2 separating the shoulder 14 from the external face 3B when the setting means 11 is in the indexed decompression position. This implies that the flow section 9 is greater when the setting means 11 is in the indexed open position than when it is in the indexed decompression position.

The structure and operation of the alternative embodiment illustrated in the figures will now be described in more detail.

In this embodiment, the appliance 1 comprises a module 16 intended to be mounted onto the lid 3, for example in a removable fashion by means of a threaded shaft 16A cooperating with a hole 16B provided in the lid 3. The module 16 comprises a seat 17 whereon an intermediate control plate 18 is mounted rotating along the axis X-X', wherein the rotation movement is controlled using a handle 19, which is preferentially attached directly to the intermediate plate 18 by means of attachment pins 18A, 18B, so as to produce a mechanical flush fitting between the handle 19 and the intermediate plate 18.

Advantageously, the seat 17 of the module 16 is covered by a cover 26 wherein a central housing intended to receive the handle 19 is provided.

The intermediate plate 18 is connected functionally to the valve 11A such that the rotation of the intermediate plate 18 controls the axial movement along the axis X-X' of the valve 11A.

Advantageously, the valve 11A comprises a flared head 21, while the intermediate plate 18 comprises a corresponding ramp 20, designed to move the head 21 vertically.

Figure 3:
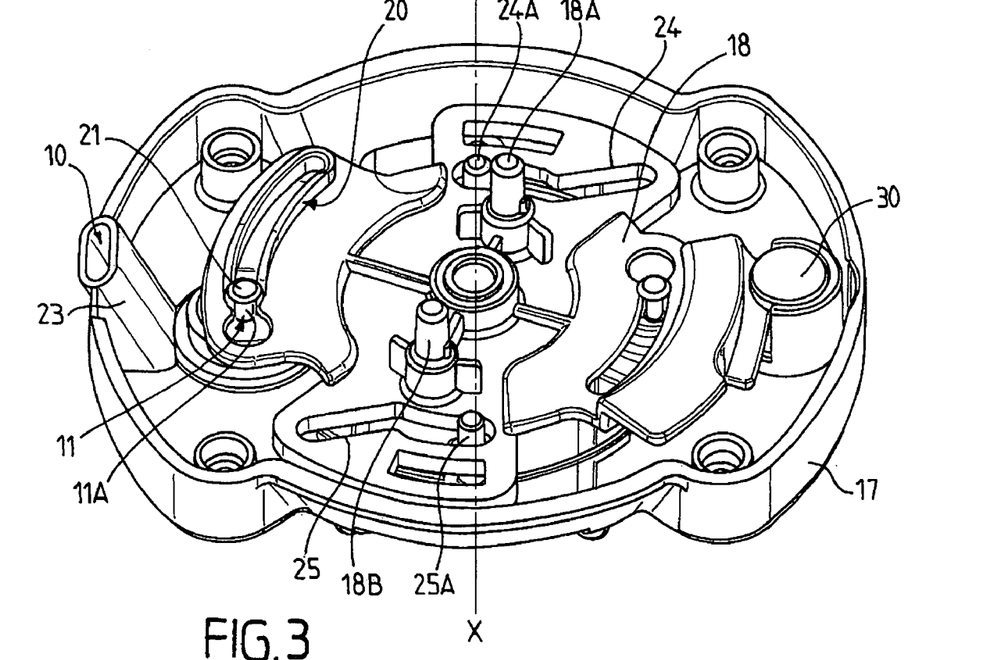
FIG. 3 is a schematic perspective view illustrating a detailed view of an embodiment of a control module intended to be mounted onto the lid represented in FIG. 2.
Figure 10:
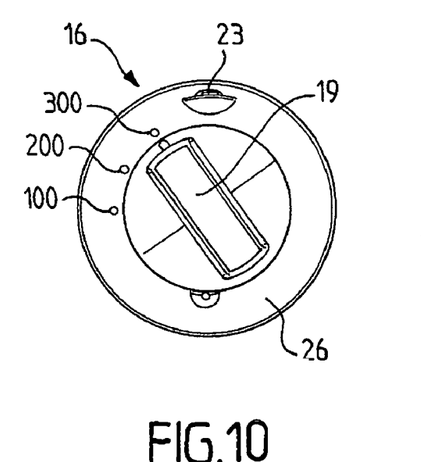
FIG. 10 is a top view of the control module in FIG. 4 and FIG. 7 in a cooking configuration.
Figure 11:
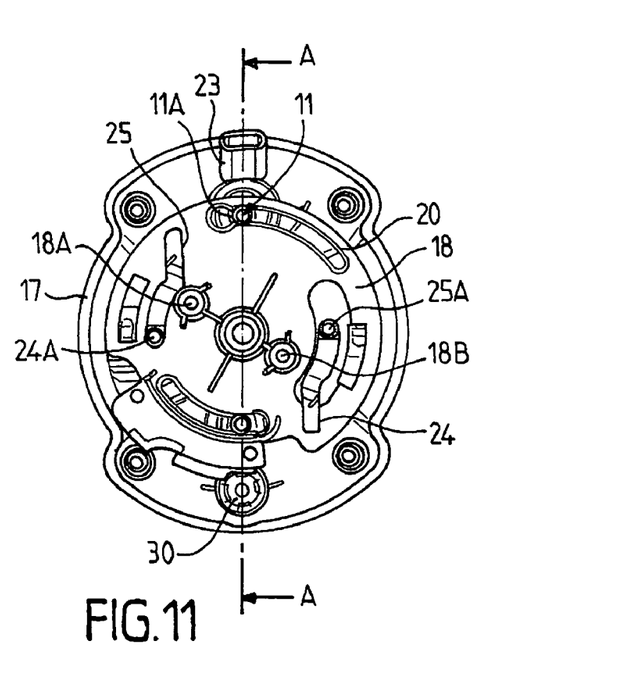
FIG. 11 is a top view of the detailed view of an embodiment illustrated in FIG. 3 when the control module is in a cooking configuration.

In this way, the ramp 20 makes it possible to vary the height of the head 21 and therefore that of the valve 11A, between a low position, represented in FIG. 3, FIG. 10, FIG. 11 and FIG.

Figure 4:
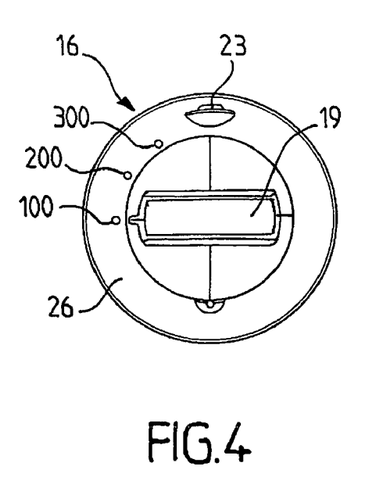
FIG. 4 is a top view of the control module for which a detailed view of an embodiment is represented in FIG. 3, said module being in an open configuration.
Figure 5:
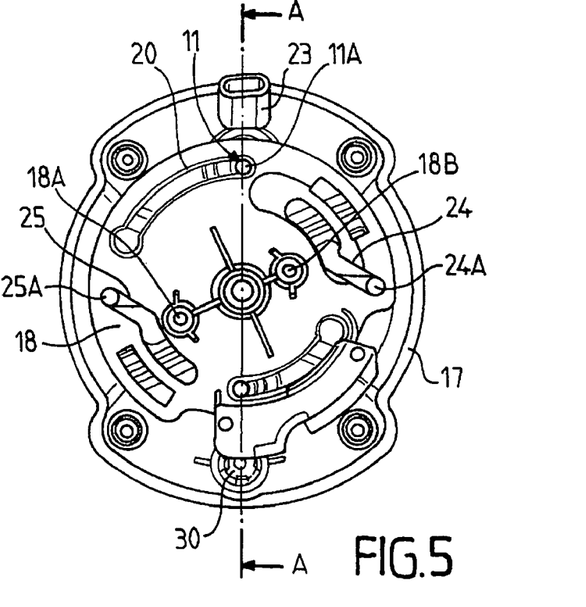
FIG. 5 is a top view of the control module for which a detailed view of an embodiment is represented in FIG. 3, when said module is in an open configuration.

12, corresponding to the indexed regulation position of the valve 11A, and a high position, illustrated in FIG. 4, FIG. 5 and FIG. 6, wherein the valve 11A is at its maximum height, said maximum height corresponding to the indexed open position. Between the two extreme positions described above, the head 21 may be in a predetermined intermediate position, wherein its height is greater than the minimum height corresponding to FIG. 12 but less than the maximum height illustrated in FIG. 6, said intermediate position corresponding to the indexed decompression position of the valve 11A. In this way, the user is able, simply by turning the handle 19, to control the decompression of the appliance 1. The continuous nature of the rotary control movement also enables the user to control the decompression very precisely, since it is advantageously not limited to the three indexed positions of the valve 11A and can position said valve at the height of their choice, by means of the, at least partially, progressive nature, of the ramp 20.

The valve 11A is preferentially fitted in a cavity 22 provided in the seat 17, said cavity 22 opening to the outside and being ringed by a gasket 22A intended to come into contact with the external face 3B of the lid 3, so as to delimit a tight chamber wherein the valve 11A can move. Said chamber delimited in this way is connected to the outside via a discharge pipe 23, said discharge pipe delimiting the outlet section 10, which is preferentially not adjustable, i.e. fixed by design.

In other words, the above mentioned chamber is connected upstream with the inside of the chamber and downstream with the discharge pipe 23.

Preferentially, the outlet section 10 of the pipe 23 is as large or larger (in surface area) than the inlet section 8. This technical characteristic makes it possible to optimize the steam leakage velocity when the setting means is in the open position, and thus helps, in cooperation with the inlet section 8, prevent any hazardous pressure rise in the appliance.

In this way, the disclosure is preferably based on an original design wherein the leakage cross-sections located upstream from the outlet section are controlled as a function of the outlet cross-section, said outlet section being fixed by design.

The intermediate plate 18 is also advantageously provided with oblique slots 24, 25 cooperating with corresponding lugs 24A, 25A attached to the jaws 5, 6, respectively. The oblique slots 24, 25 are arranged such that the rotation of the intermediate plate 18 induces the radial movement of the corresponding lugs 24A, 25A and therefore the movement of the jaws 5, 6 attached thereto.

As a result, the intermediate plate 18 simultaneously carries out the control of the axial movement of the valve 11A and the radial movement of the jaws.

The ramp 20 and the oblique slots 24, 25 are preferentially arranged such that when the valve 11A is in the indexed open position, the jaws 5, 6 are unlocked such that the user can, as desired, remove and replace the lid on the vessel 2. The intermediate plate 18 is also arranged such that when the valve 11A is in the decompression position, the jaws 5, 6 are locked this time, and naturally remain so when the valve 11A reaches its regulation position.

In this way, as long as the jaws are not locked, the valve 11A is in the open position.

Figure 7:
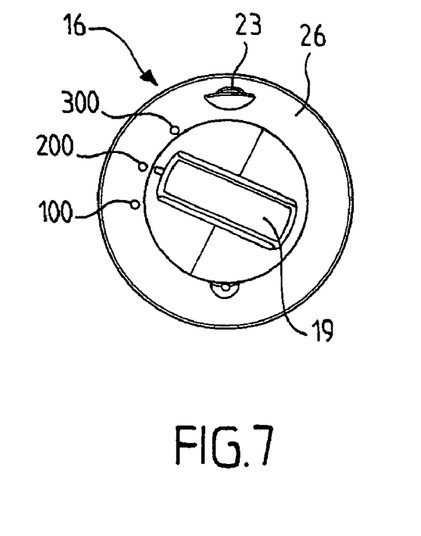
FIG. 7 is a top view of the module in FIG. 4 in a decompression configuration.
Figure 8:
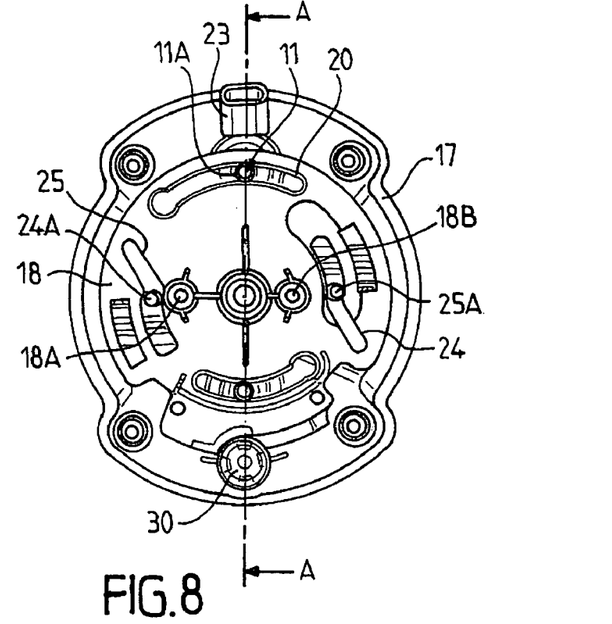
FIG. 8 is a top view of the detailed view of an embodiment of the module represented in FIG. 3 when said module is in a decompression configuration.

In this way, the appliance 1 according to the disclosure enables quick and safe decompression, since the user, in order to decompress an appliance in operation (FIG. 10, FIG. 11 and FIG. 12), first of all turns the handle 19 (in the anti-clockwise direction in the figures) to an identified decompression position (FIG. 7, FIG. 8 and FIG. 9), wherein it causes a steam leakage with no food projection by setting the setting means to its decompression position. Once this safe decompression phase is complete (when the pressure in the chamber has reached or is below the predetermined safety pressure), the user can then turn the handle 19 again (in the anti-clockwise direction in the figures) to the open position (FIG. 4, FIG. 5 and FIG. 6) wherein the decompression of the appliance will be finished completely safely and quickly, the settings means then being in the decompression position.

It should be noted that the end of the safe decompression operation, corresponding to the indexed decompression position of the valve 11A, may be indicated by a pressure gauge 30, which, depending on its vertical position, provides a visual signal to the user.

Said gauge 30 may also represent opening/closing safety means, and thus cooperate with the intermediate plate 18 to prevent the rotation of said plate from the decompression position to the open position while the pressure applied in the chamber exceeds the predetermined safety pressure.

Definitively, the disclosure particularly enables, (1) the decompression of the appliance without food projection and preferentially without switching off the heating source, and (2) the prevention of a pressure rise in the appliance if it is closed incorrectly, by means of a simple, ergonomic and compact design.

Therefore, the disclosure also relates, as already mentioned above, to a method to cook food using a household pressure cooking appliance 1 arranged to form a cooking chamber, said appliance 1 comprising an adjustment device 7 of the pressure inside the chamber, said device 7 itself comprising a leakage pipe used to establish a steam leakage flow from inside the chamber to outside the appliance 1, said pipe defining, firstly, a steam inlet section 8, through which the steam contained in the chamber enters the pipe, and, secondly, a flow section 9, located downstream from the inlet section in the direction of the leakage flow, the adjustment device 7 comprising setting means 11 of the inlet section 8 and flow section 9.

According to the disclosure, said method comprises, firstly, an opening step, wherein, using the setting means 11, the inlet and flow sections are set to enable a steam leakage via the pipe while preventing the pressure applied in the chamber rising above a predetermined safety pressure, and, secondly, a decompression step, during which, using the setting means 11, the inlet section 8 and flow section 9 are set to enable the quickest possible decompression of the chamber to the predetermined safety pressure, without substantial projection of foods outside the appliance 1.

Advantageously, the opening step is subsequent to the decompression step.

More preferentially, the opening step is carried out when the pressure applied inside the chamber is less than or equal to the predetermined safety pressure.

Therefore, the disclosure is based on the use of sequential decompression in two stages, during which the user starts by setting the appliance to the decompression position, the leakage pipe being configured and designed to enable the quickest possible pressure drop of the chamber without food projection, and then, when the pressure in the chamber has reached the predetermined safety level, the user sets the appliance to the open position, wherein the leakage pipe is configured and designed to enable the pressure inside the chamber to be returned quickly to atmospheric pressure, while preventing the pressure from exceeding the predetermined safety level.

In a complementary and independent fashion, in conjunction with the general technical concept described above, the disclosure also relates to a household food pressure cooking appliance 1 arranged to form a cooking chamber, said appliance 1 comprising a leakage pipe used to establish a steam leakage flow from inside the chamber to outside the appliance 1, said pipe defining, firstly, a steam inlet section 8, through which the steam contained in the chamber enters the pipe, and, secondly, a flow section 9, located downstream from the inlet section 8 in the direction of the leakage flow, said appliance 1 also comprising setting means 11 of the inlet section 8 and flow section 9, said setting means 11 being mobile between at least, firstly, an indexed open position, wherein it sets the inlet section 8 and flow section 9 to enable a steam leakage via the pipe while preventing the pressure applied in the chamber rising above a predetermined safety pressure, and, secondly, an indexed decompression position, wherein it sets the inlet section 8 and flow section 9 to enable the quickest possible decompression of the chamber to the predetermined safety pressure.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure.

Now, therefore, at least the following is claimed:

1. A food pressure cooking appliance (1) arranged to form a cooking chamber designed to be pressurized, said appliance (1) comprising:
   an adjustment device (7) of the pressure inside the chamber, said device (7) comprising:
      a leakage pipe used to establish a steam leakage flow from inside the chamber to outside the appliance (1), said pipe defining a steam inlet section (8), through which the steam contained in the chamber enters the pipe, and a flow section (9), located downstream from the inlet section (8); and
      setting means (11) of the inlet section (8) and flow section (9), said setting means (11) being mobile between at least, firstly, an open position, wherein it sets the inlet section (8) and flow section (9) to enable a steam leakage via the pipe while preventing the pressure applied in the chamber from rising above a predetermined safety pressure, and, secondly, a decompression position, wherein it sets the inlet section (8) and flow section (9) to enable decompression of the chamber to the predetermined safety pressure, without substantial projection of foods outside the appliance (1) and in which said open position and said decompression position provide a continuous steam leakage flow.

2. The appliance (1) according to claim 1, wherein the open position is an indexed position.

3. The appliance (1) according to claim 1, wherein the decompression position is an indexed position.

4. The appliance (1) according to claim 1, further comprising a pressure regulation valve (11A), said valve (11A) forming the setting means (11).

5. The appliance (1) according to claim 4, wherein the setting means (11) is in at least one indexed regulation position, wherein, firstly, it substantially prevents any connection of the inside of the chamber to the outside while the pressure applied in the chamber is less than a predetermined regulation pressure and, secondly, it connects the inside of the chamber with the outside once the pressure applied in the chamber has substantially reached said predetermined regulation pressure.

6. The appliance (1) according to claim 1, wherein the cooking chamber is subjected to the effect of a heating source, the setting means (11), when it is in its decompression position, setting the inlet section (8) and flow section (9) to enable the quickest possible decompression of the chamber to the predetermined safety pressure, without substantial projection of foods outside the appliance (1) without switching off the heating source.

7. The appliance (1) according to claim 1, wherein the inlet section (8) and flow section (9) are oriented substantially at an angle with respect to each other, and are preferentially oriented substantially transversally with respect to each other.

8. The appliance (1) according to claim 1, further comprising a vessel (2) and a lid (3) mounted on the vessel (2) to form the cooking chamber, said lid (3) comprising an internal face (3A) located opposite the vessel (2), and an opposite external face (3B), oriented toward the outside of the vessel (2).

9. The appliance (1) according to claim 8, wherein the setting means (11) is fitted in a sliding configuration onto the lid (3).

10. The appliance (1) according to claim 9, wherein the setting means (11) further comprises a cylindrical body comprising at least two segments (12, 13) separated by a shoulder (14), said shoulder (14) taking part in the setting of the flow section (9), while at least one of said segments (12) takes part in the settings of the inlet section (8).

11. The appliance (1) according to claim 10, wherein the cylindrical body further comprises at least a first, a second and a third segment (12, 12A, 13), said first and second segments (12, 12A) being separated by a first shoulder (12B), said second and third segments (12A, 13) being separated by a second shoulder (14), said cylindrical body being arranged with respect to the pipe such that, firstly, the first and second segments (12, 12A) take part in alternation in the setting of the inlet section (8), and that, secondly, the second shoulder (14) takes part in the setting of the flow section (9).

12. The appliance (1) according to claim 8, wherein the adjustment device (7) further comprises a leakage orifice (15), provided in the lid (3) and forming an access opening to the leakage pipe, the inlet section (8) being defined by the cooperation of the leakage orifice (15) with the setting means (11).

13. The appliance (1) according to claim 11, wherein with the setting means (11) in the indexed open position, the first segment (12) is inserted into the leakage orifice (15), such that the inlet section (8) has a first annular shape.

14. The appliance (1) according to claim 11, wherein with the setting means (11) in the decompression position, the second segment (12A) is inserted into the leakage orifice (15), such that the inlet section (8) has a second annular shape.

15. The appliance (1) according to claim 8, wherein the flow section (9) is defined by the cooperation of the external face (3B) of the lid (3) with the setting means (11).

16. The appliance (1) according to claim 12, wherein the flow section (9) is defined by the cooperation of the external face (3B) of the lid (3) with the second shoulder (14).

17. The appliance (1) according to claim 5, wherein with the setting means (11) in the indexed regulation position, the second shoulder (14) rests against the external face (3B) of the lid (3) so as to seal the leakage orifice (15), while the pressure applied in the chamber is less than the predetermined regulation pressure, said second shoulder (14) moving away from the external face (3B) to enable the outflow of steam when the pressure applied in the chamber has substantially reached said regulation pressure.

18. The appliance (1) according to claim 16, wherein with the setting means (11) in the open position, the second shoulder (14) is at an interval of a first distance (H1) from the external face (3B) of the lid (3).

19. The appliance (1) according to claim 17, wherein with the setting means (11) in the decompression position, the second shoulder (14) is at an interval of a second distance (H2) from the external face (3B) of the lid (3).

20. The appliance (1) according to claim 1, wherein the pipe defines a steam outlet section (10), located downstream from the flow section (9) in the direction of the leakage flow, said steam outlet section (10) being non-adjustable.

21. The appliance (1) according to claim 1, wherein it consists of a pressure cooker.

* * * * *